United States Patent
Behrens et al.

(10) Patent No.: US 12,232,515 B2
(45) Date of Patent: Feb. 25, 2025

(54) COMPOSITIONS AND METHODS FOR POLYMER BASED SHELF LIFE EXTENSION

(71) Applicant: CAMBRIDGE CROPS, INC., Somerville, MA (US)

(72) Inventors: Adam M. Behrens, Cambridge, MA (US); Sezin Yigit, Arlington, MA (US); Laith M. Abu-Taleb, Washington, DC (US); Nadia S. Hallaj, Cambridge, MA (US); Colin D. Preston, Boston, MA (US); Samantha E. Roman, Cambridge, MA (US); James L. Sugarman, Boston, MA (US)

(73) Assignee: Cambridge Crops, Inc., Boston, MA (US)

(*) Notice: Subject to any disclaimer, the term of this patent is extended or adjusted under 35 U.S.C. 154(b) by 481 days.

(21) Appl. No.: 16/707,014

(22) Filed: Dec. 9, 2019

(65) Prior Publication Data

US 2020/0178576 A1    Jun. 11, 2020

Related U.S. Application Data

(60) Provisional application No. 62/777,512, filed on Dec. 10, 2018.

(51) Int. Cl.
   *A23B 4/20* (2006.01)
   *A23B 4/10* (2006.01)
   (Continued)

(52) U.S. Cl.
   CPC .............. *A23L 3/3472* (2013.01); *A23B 4/10* (2013.01); *A23B 4/20* (2013.01); *A23B 7/154* (2013.01); *A23B 7/16* (2013.01)

(58) Field of Classification Search
   CPC ................ A23B 4/10; A23B 4/20; A24B 4/20
   See application file for complete search history.

(56) References Cited

U.S. PATENT DOCUMENTS

| 4,233,212 A | 11/1980 | Otoi et al. |
| 5,853,764 A | 12/1998 | Tsubouchi |
| (Continued) | | |

FOREIGN PATENT DOCUMENTS

| CN | 107307062 A | 11/2017 |
| WO | WO 2007/016524 A2 | 2/2007 |
| (Continued) | | |

OTHER PUBLICATIONS

Ajisawa, "Dissolution of silk fibroin with calcium chloride/ethanol aqueous solution," J. Seric. Sci. Jpn., 67(2):91-94, (1998).

(Continued)

*Primary Examiner* — Elizabeth Gwartney
(74) *Attorney, Agent, or Firm* — Finnegan, Henderson, Farabow, Garrett & Dunner, LLP

(57) ABSTRACT

The present disclosure relates to compositions, solutions, and methods for extending the shelf life of food compositions. For example, the disclosure is directed to food compositions or solutions comprising silk fibroin. In some instances, the compositions may be coated with a silk fibroin layer. The disclosure is also directed to methods of preparing food compositions. The methods include spray-coating, dip-coating, or mixing the food compositions with fragments of silk fibroin.

19 Claims, 8 Drawing Sheets
(8 of 8 Drawing Sheet(s) Filed in Color)

(51) Int. Cl.
A23B 7/154 (2006.01)
A23B 7/16 (2006.01)
A23L 3/3472 (2006.01)

(56) References Cited

U.S. PATENT DOCUMENTS

| | | |
|---|---|---|
| 8,354,501 B2 | 1/2013 | Kaplan et al. |
| 9,731,052 B2 | 8/2017 | Kaplan et al. |
| 10,271,561 B2 | 4/2019 | Omenetto et al. |
| 2013/0243693 A1 | 9/2013 | Omenetto et al. |
| 2015/0093340 A1 | 4/2015 | Altman et al. |
| 2016/0046679 A1 | 2/2016 | Kluge et al. |

FOREIGN PATENT DOCUMENTS

| | | |
|---|---|---|
| WO | WO 2012/145739 A1 | 10/2012 |
| WO | WO 2013/159101 A1 | 10/2013 |
| WO | WO 2014/145002 A2 | 9/2014 |
| WO | WO 2015/134865 A1 | 9/2015 |
| WO | WO 2016/029034 A1 | 2/2016 |

OTHER PUBLICATIONS

Ali et al., "Gum arabic as a novel edible coating for enhancing shelf-life and improving postharvest quality of tomato (*Solanum lycopersicum* L.) fruit," Postharvest Biology and Technology, 58:42-47, (2010).
Basal et al., "Antibacterial Properties of Silk Fibroin/Chitosan Blend Films Loaded with Plant Extract," Fibers and Polymers, 11(1):21-27, (2010).
Boulet-Audet et al., "Dry-Spun Silk Produces Native-Like Fibroin Solutions," Biomacromolecules, 17(10):3198-3204, (2016).
Cheng et al., "Differences in regenerated silk fibroin prepared with different solvent systems: From structures to conformational changes," J. Appl. Polym. Sci., 41959:1-8, (2015).
Freddi et al., "Swelling and dissolution of silk fibroin (*Bombyx mori*) in N-methyl morpholine N-oxide," Int J Biol Macromol, 24(2-3):251-263, (1999).
Fuchs et al., "Effect of Edible Coatings on Postharvest Quality of Fresh Green Asparagus," Journal of Food Processing and Preservation, 32:951-971, (2008).
Furuhata et al., "Dissolution of silk fibroin in lithium halide/organic amide solvent systems," J. Seric. Sci. Jpn., 63(4):315-322, (1994).
Gobin et al., "Structural and mechanical characteristics of silk fibroin and chitosan blend scaffolds for tissue regeneration," J Biomed Mater Res A, 74(3):465-473, (2005).
Gong et al., "Two distinct beta-sheet fibrils from silk protein," Chem Commun (Camb), (48):7506-7508, (2009).
Haggag et al., "Degumming of Silk Using Microwave-Assisted Treatments," Journal of Natural Fibers, 4(3):1-22, (2007).
Hino et al., "Change in secondary structure of silk fibroin during preparation of its microspheres by spray-drying and exposure to humid atmosphere," J Colloid Interface Sci, 266(1):68-73, (2003).
Hu et al., "Determining Beta-Sheet Crystallinity in Fibrous Proteins by Thermal Analysis and Infrared Spectroscopy," Macromolecules, 39:6161-6170, (2006).
Jaramillo-Quiceno et al., "Water-annealing treatment for edible silk fibroin coatings from fibrous waste," J. Appl. Polym. Sci, 48505:1-8, (2019).
Kamalha et al., "Analysis of the secondary crystalline structure of regenerated *Bombyx mori* fibroin," RRBS, 7(2):76-83, (2013).
Khalifa et al., "Application of sericin to modify textile supports," The Journal of Textile Institute, 103(4):370-377, (2012).
Khan et al., "Physical properties and dyeability of silk fibers degummed with citric acid," Bioresour Technol, 101(21):8439-8445, (2010).
Kim et al., "Formulation of Biologically-Inspired Silk-Based Drug Carriers for Pulmonary Delivery Targeted for Lung Cancer," Sci Rep, 5:11878, (2015).

Kluge et al., "Optimizing molecular weight of lyophilized silk as a shelf-stable source material," ACS Biomater. Sci. Eng., (2016).
Kluge et al., "Silk-based blood stabilization for diagnostics," Proc Natl Acad Sci U S A, 113(21):5892-5897, (2016).
Koh et al., "Structures, mechanical properties and applications of silk fibroin materials," Progress in Polymer Science, 46:86-110, (2015).
Kundu et al., "Isolation and processing of silk proteins for biomedical applications," Int J Biol Macromol, 70:70-77, (2014).
Kweon et al., "Dissolution and Characterization of Regenerated *Antheraea pernyi* Silk Fibroin," Journal of Applied Polymer Science, 82:750-758, (2001).
Li et al., "Silk-based stabilization of biomacromolecules," J Control Release, 219:416-430, (2015).
Li et al., "Regenerated silk materials for functionalized silk orthopedic devices by mimicking natural processing," Biomaterials, 110:24-33, (2016).
Li et al., "Enhanced Stabilization in Dried Silk Fibroin Matrices," Biomacromolecules, 18:2900-2905, (2017).
Li et al., "Fabrication and characterization of microencapsulated n-octadecane with silk fibroin-silver nanoparticles shell for thermal regulation," Journal of Materials Research, 34(12):2047-2056, (2019).
Lin et al., "Cold plasma treated thyme essential oil/silk fibroin nanofibers against *Salmonella* Typhimurium in poultry meat," Food Packaging and Shelf Life, 21:100337, (2019).
Liu et al., "Exploring the Structural Transformation Mechanism of Chinese and Thailand Silk Fibroin Fibers and Formic-Acid Fabricated Silk Films," Int J Mol Sci, 19(11), (2018).
Lu et al., "Stabilization of Enzymes in Silk Films," Biomacromolecules, 10:1032-1042, (2009).
Lu et al., "Stabilization and Release of Enzymes from Silk Films," Macromol. Biosci., 10:359-368, (2010).
Malay et al., "Relationships between physical properties and sequence in silkworm silks," Sci Rep, 6:27573, (2016).
Marelli et al., "Silk Fibroin as Edible Coating for Perishable Food Preservation," Sci Rep, 6:25263, (2016).
Marelli et al., Supporting Information, "Silk Fibroin as Edible Coating for Perishable Food Preservation," Sci Rep, 6:25263, (2016).
Meng et al., "Controllable in situ synthesis of silver nanoparticles on multilayered film-coated silk fibers for antibacterial application," J Colloid Interface Sci, 461:369-375, (2016).
Meshram et al., "Extraction of lithium from primary and secondary sources by pre-treatment, leaching and separation: A comprehensive review," Hydrometallurgy, 150:192-208, (2014).
Pawcenis et al., "Size exclusion chromatography for analyses of fibroin in silk: optimization of sampling and separation conditions," Appl. Phys. A, 114:301-308, (2014).
Pritchard et al., "Encapsulation of Oil in Silk Fibroin Biomaterials," J. Appl. Polym. Sci., 39990:1-11, (2014).
Rnjak-Kovacina et al., "The effect of sterilization on silk fibroin biomaterial properties," Macromol Biosci, 15(6):861-874, (2015).
Rockwood et al., "Materials fabrication from Bombyx mori silk fibroin," Nat Protoc, 6(10): 1612-1631, (2011).
Sah et al., "The extraction of fibroin protein from *Bombyx mori* silk cocoon: Optimization of process parameters," International Journal of Bioinformatics Research, 2(2):33-41, (2010).
Saha et al., "Extraction, Structural and Functional Properties of Silk Sericin Biopolymer from *Bombyx mori* Silk Cocoon Waste," J Textile Sci Eng, 9(1):1000390, (2019).
Sashina et al., "Dissolution of Silk Fibroin in N-methylmorpholine-N-oxide and Its Mixtures with Organic Solvents," Russian Journal of Applied Chemistry, 76(1):128-131, (2003).
Sashina et al., "Structure and Solubility of Natural Silk Fibroin," Russian Journal of Applied Chemistry, 79(6):869-876, (2006).
Shen et al., "Dissolution behavior of silk fibroin in a low concentration $CaCl_2$-methanol solvent: From morphology to nanostructure," Int J Biol Macromol, 113:458-463, (2018).
Silva et al., "Glycerin and Ethanol as Additives on Silk Fibroin Films: Insoluble and Malleable Films," J. Appl. Polym. Sci., (2013).
Sparkes et al., "Analysis of the pressure requirements for silk spinning reveals a pultrusion dominated process," Nat Commun, 8(1):594, (2017).

(56) References Cited

OTHER PUBLICATIONS

Srihanam et al., "Silk fibroin microspheres prepared by the water-in-oil emulsion solvent diffusion method for protein delivery," Korean J. Chem. Eng., 28(1):293-297, (2011).

Tabatabai et al., "Acid induced assembly of a reconstituted silk protein system," (2018).

Toms et al., "Determination of the Configuration of Silk Fibroin Dissolved in Aqueous Solutions of Lithium Bromide," Nature, 169:877-878, (1952).

Vaithanomsat et al., "Production of Water-Soluble Silk Powder from *Bombyx mori* Lin. (Nang-Noi Srisakate 1)," Kasetsart J. (Nat. Sci.), 40:152-158, (2006).

Vepari et al., "Silk as a Biomaterial," Prog Polym Sci, 32(8-9):991-1007, (2007).

Wang et al., "Colloidal Stability of Silk Fibroin Nanoparticles Coated with Cationic Polymer for Effective Drug Delivery," ACS Appl Mater Interfaces, 7(38):21254-21262, (2015).

Wang et al., "Effect of silk degumming on the structure and properties of silk fibroin," The Journal of the Textile Institute, (2018).

Wray et al., "Effect of processing on silk-based biomaterials: reproducibility and biocompatibility," J Biomed Mater Res B Appl Biomater, 99(1):89-101, (2011).

Wu et al., "Nanofiltration recovery of sericin from silk processing waste and synthesis of a lauroyl sericin-based surfactant and its characteristics," RSC Adv., 4:4140-4145, (2014).

Wu et al., "Control of silk microsphere formation using polyethylene glycol (PEG)," Acta Biomaterialia, (2016).

Yamada et al., "Preparation of undegraded native molecular fibroin solution from silkworm cocoons," Materials Science and Engineering C, 14:41-46, (2001).

Yazawa et al., "Influence of Water Content on the β-Sheet Formation, Thermal Stability, Water Removal, and Mechanical Properties of Silk Materials," Biomacromolecules, 17(3):1057-1066, (2016).

Zheng et al., "Lithium-free processing of silk fibroin," Journal of Biomaterials Applications, 31(3):450-463, (2016).

Zong et al., "Effect of pH and Copper(II) on the Conformation Transitions of Silk Fibroin Based on EPR, NPR, and Raman Spectroscopy," Biochemistry, 43:11932-11941, (2004).

International Search Report and Written Opinion for PCT/US19/65268, mailed Mar. 23, 2020.

Day, BPF. "Fruit and Vegetables." *Principles and Applications of Modified Atmosphere Packaging of Foods*, Springer-Verlag, 1993, pp. 114-133.

Examination Report in Great Britain Patent Application No. GB2107809.2, mailed May 5, 2022, 6 pages.

Day 14

+ 24 Days

COMPOSITIONS AND METHODS FOR POLYMER BASED SHELF LIFE EXTENSION

CROSS-REFERENCE TO RELATED APPLICATION

This application claims priority from U.S. Provisional Patent Application No. 62/777,512, filed Dec. 10, 2018, which is hereby incorporated by reference in its entirety.

FIELD OF THE DISCLOSURE

Aspects of the present disclosure pertain to compositions, solutions, and methods for preparing fibroin proteins and its use in extending the shelf-life of perishables and on substrates.

BACKGROUND OF THE DISCLOSURE

One third of the food produced in the world is wasted each year and over 45% of all fruits and vegetables are lost to spoilage. Food waste has massive economic, social, and environmental implications. According to the Natural Resources Defense Council (NRDC), a prominent non-profit international environmental advocacy group, the United States loses 40% of its food supply resulting in an estimated economic loss of $165 billion per year. Embodiments of the present disclosure directly address the broader societal need for reducing food waste and increasing food availability by extending the shelf-life of perishables. Embodiments of the present disclosure represent significant commercial value by increasing revenue through improved distribution, reducing waste, and decreasing costs associated with cold storage and transport.

Exemplary compositions of the present disclosure comprise natural and edible silk coatings that are able to extend the shelf life of perishable goods and decrease reliance on energy and cost intensive cold chains. The silk coatings of the present disclosure may be odorless, low cost, edible, compostable, and biodegradable. When deposited onto the surface of perishable foods, these coatings are able to drastically extend the foods' shelf life. Many of today's state-of-the-art food preservation strategies rely on petroleum based synthetic coatings, genetic modifications, single-use packaging, and a heavy reliance on the cold-chain. While these methods have shown moderate success, they have become less sustainable to people seeking a natural way of reducing food waste with a far lower carbon footprint. Coating compositions of the present disclosure offer a unique combination of advantages to augment or replace these approaches.

Silk fibroin is a structural protein that may be produced and extracted from silkworm, spiders, or other insects. It can also be otherwise generated synthetically. Silk fibroin is naturally produced by species such as, without limitation, *Antheraea mylitta*; *Araneus bicentenarius*; *Araneus ventricosus*; *Bombyx mori*; *Bombyx mandarins*; *Galleria mellonella*; *Nephila clavipes*; *Nephila madagascariensis*; and *Tetragnatha versicolor*. Silk fibroin's unique properties are derived from its structure, consisting of hydrophobic blocks separated by hydrophilic spacers. In its natural state, silk fibroin is organized in beta-sheets, which are formed by highly ordered crystalline regions alternated by amorphous regions. This unique structure results in high levels of strength and toughness for silk fibroin-based materials. The wide range of forms into which silk fibroin solution can be processed make it attractive for several high-tech applications, including scaffolds for tissue engineering, bone screws for fixation, and drug depots for therapeutic delivery.

Among other insects, the *Bombyx mori* silkworm starts its life in a cocoon. A single cocoon can be made up of hundreds of meters of silk. The cocoon itself is made up largely by two proteins: fibroin and sericin. With the other component parts, the fibroin helps regulate gas diffusion in and out of the cocoon. Similarly, such regulation is achievable with silk fibroin-based materials. This is applicable to extending the shelf-life of perishables given that the main modes of spoilage relate to oxidation, degradation, and dehydration. When applied to agriculture, the tunability of silk fibroin allows for its versatility of application across different produce types. Silk fibroin forms polymeric coatings with varying degree of solubility and breathability. Fine-tuning is enabled by different production parameters such as concentration, shear force, additives, temperature, and postprocessing. By tuning these parameters, silk-fibroin structural organization may be controlled. Structural differences ultimately affect crystallinity, elasticity, solubility and porosity which in turn alter the gas and water diffusion behavior, as well as reduce microbial growth rates. Silk coatings can be designed for different storage conditions or products of interest.

SUMMARY OF THE DISCLOSURE

In some aspects, the present disclosure relates to the following embodiments. One embodiment is directed to a food composition comprising silk fibroin, wherein the silk fibroin was previously in a powder form or in a solution in which powdered silk fibroin has been reconstituted within a solvent. Food compositions of the present disclosure may include materials that are edible in either a cooked, prepared, processed, or raw state and that are susceptible to at least one type of damage or reduction in quality, which typically involves changes in one or more parameters, such as microbial growth, color, water content, mass loss, taste, smell, texture, viral or fungal growth, firmness, or other parameters. Non-limiting examples include cooked or uncooked meats, proteins, carbohydrates, produce, nuts, grains, seeds, dairy, beverages, processed foods (e.g., chocolates, candies, chips, snacks, energy bars), gums, tablets, capsules, plants, roots, fungi, spores, breads, dried fruits, dried vegetables, dehydrated foods, medical foods, and the like. Further examples include the peels or outer layers of foods; for example, a banana peel, avocado peel, pistachio or nut shells, citrus peel, or the like.

Another embodiment is directed to a solution containing silk fibroin. In some aspects, no more than 25% of the solution may comprise silk fibroin fragments. In some further aspects, no more than 10% of the silk fibroin fragments may have a molecular weight of over 400 kilodaltons (kDa). In some alternative further aspects, no more than 45% of the silk fibroin fragments may have a molecular weight of over 300 kDa.

Another embodiment is directed to a composition comprising a substrate. In some aspects, the substrate may be coated with at least one silk fibroin layer. In some aspects, the thickness of the at least one silk fibroin layer may range from about 12 nm to about 180 µm. Substrates of the present disclosure may include perishables, perishable items, perishable goods, or perishable products that may be edible in cooked, prepared, processed, or raw forms. These terms may be defined as something that is likely to decay, spoil, or degrade. Non-limiting examples of a perishable include food, food items, candy, meat, gum, produce, baked goods, vegetables, fruits, power bars, granola bars, cereal, chocolates, processed foods, tablets, sugars, protein powders, flavor powders, and others. Edible peels and coatings may also be included. Further examples include inedible peels and coatings, such as banana peels, citrus peels, avocado peels, pistachio or nut shells, or the like.

Another embodiment is directed to a method of preparing a food composition. In some aspects, the method may comprise spray-coating the food composition with a solution containing silk fibroin fragments. In some aspects, the silk fibroin fragments may range from 10 kDa to 600 kDa.

Another embodiment is directed to a method of preparing a food composition. In some aspects, the food composition may comprise dip-coating the food composition with a solution containing silk fibroin fragments. In some aspects, the silk fibroin fragments may range from 10 kDa to 600 kDa.

Another embodiment is directed to a method of preparing a food composition. In some aspects, the food composition may comprise mixing the food composition with silk fibroin fragments. In some aspects, the silk fibroin fragments may range from 10 kDa to 600 kDa.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE DISCLOSURE

Embodiments of the present disclosure are compositions, solutions, and methods for extending the shelf life of food compositions.

Figure 10A:
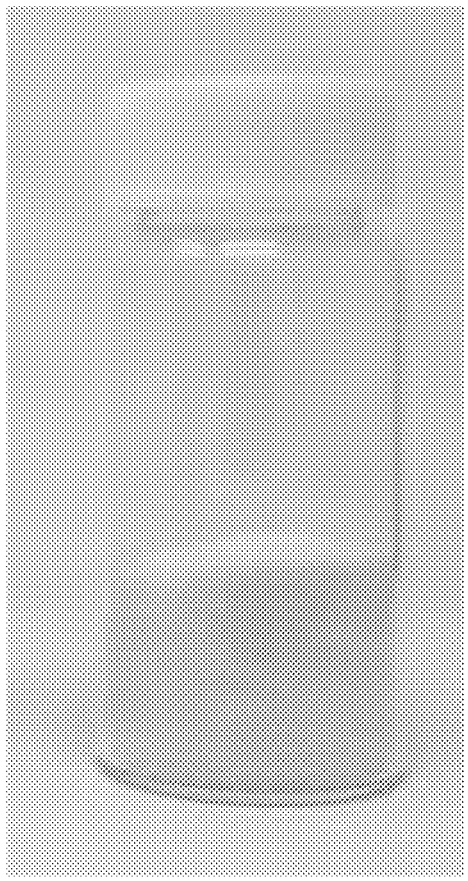
FIG. 10A depicts silk fibroin powder.
Figure 10B:
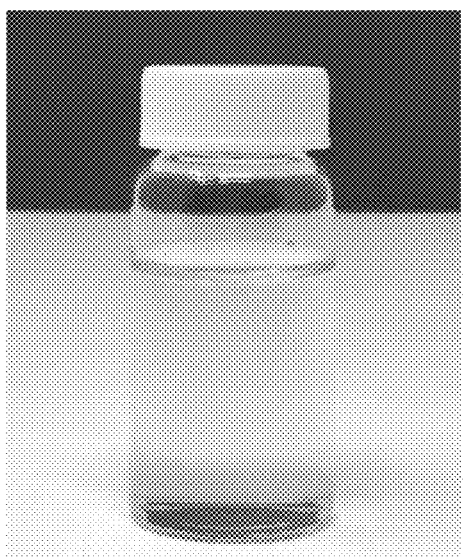
FIG. 10B depicts silk fibroin solution.

One embodiment may be directed to a food composition comprising silk fibroin. In some aspects, the silk fibroin may be a dried powder, such as in FIG. 10A. In some further aspects, the silk fibroin may be in liquid form, such as in FIG. 10B. In some aspects, the solution may comprise the silk fibroin powder mixed with a solvent. In some aspects, the solvent may be a liquid. In some further aspects, the solvent may be an acid with a pH under 6.0. Alternatively, the solvent may be an alcohol or water. In other aspects, the solvent may be acetic acid. In some aspects, the silk fibroin powder may be in a mixture containing an additive. In some alternative embodiments, the liquid solvent may contain an additive. In some embodiments, both the silk fibroin powder mixture and the liquid solvent may contain additives. In some alternative aspects, the silk fibroin may be emulsified with the additive prior to being mixed into the solution. For example, liquid silk fibroin may be mixed or dry-blended with the additive prior to being mixed into the solution. In some aspects, the additive may be at least one of a sugar, a plasticizer, or a crosslinking agent. For example, the sugar additive may be a sugar-ol, a poly-ol, or a hygroscopic polymer (e.g., polyethylene glycol). In other examples, if the sugar additive is a crosslinking agent, the crosslinking agent may be photoreactive. Specifically, the crosslinking agent may be, for example, one or more of horseradish peroxidase, lysyl oxidase, disuccinimidyl suberate, disuccinimidyl glutarate, N-hydroxysuccinimide ester, or an aryl azide. In some alternative aspects, the additive may include one or more of a bacteria, a metal, an enzyme, or a biologic. For example, the metal may include one or more of an alkali metal, an alkaline earth metal, or a transition metal. In other examples, the biologic may be an insulin glargine, infliximad, rituximab, etanercept, adalimumab, monoclonal antibodies, trastuzumab, or other biologics. In other examples, the additive may be an oligonucleotide, such as an RNA. The RNA may be tRNA, mRNA, rRNA, snRNA, srpRNA, gRNA, TERC, SL RNA, crRNA, miRNA, siRNA, or eRNA. Alternatively, in other examples, the additive may be an enzyme (i.e., an RNase or a DNase), a fatty acid, a sugar (e.g., an alcohol sugar), or a mineral. For example, the enzyme may include erepsin maltase, lactase, sucrase, disaccharidases, lingual lipase, lysozymes, salivary amylase, pepsin, gastric lipase, other lipases, hydrochloric acids, intrinsic factors, mucins, gastrins, trypsinogen, ductal cells, carboxypeptidase, elastases, and the like. In some other alternative aspects, the additive may be at least one of a coloring agent, a chelator, a ligand, an antimicrobial, a filler, a scent, or a flavor. For example, the coloring agent may be allura red, Ponceau 3R, amaranth, erythrosine, indigotine, Light Green SF, Naphthol yellow, Orange 1, quinoline yellow, tartrazine, an E1 suit (e.g., E100, E161b, etc.), an anthocyanin, a betacyanin, a carotenoid, or a phenolic. In other examples, the chelator may be ethylenediaminetetraacetic acid (EDTA), transferrin, or desferrixoxamine. In other examples, the microbial may be acetic acid, benzoic acid, natamycin, nisin, nitrate, nitrite, propionic acid, sorbic acid, sulfite, or sulfur dioxide. In other examples, the filler may be cellulose. In other alternative embodiments, the additive may be at least one of a vitamin, a nutrient, an antioxidant, and a protein. In some examples, the protein may be a peptide, an amino acid, (e.g., a post-translated amino acid), or a synthetic amino acid. A nutrient may be defined as a mineral, protein, carbohydrate, fat, Q10, glutathione, lithium, probiotic, glycine, DHA, flavonoid, or others. An antioxidant may include vitamins C and E, selenium, carotenoids, thiols, catalase, superoxide dismutase, uric acid, and ubiquinol. In some further alternative embodiments, the additive may be at least one of a green tea extract, a rosemary extract, a phenolic antioxidant, catechin, acerola, tocopherol, chamomile extract, *Malphigia emarginata*, *Camellia sinensis*, epicatechin, epigallocatechin, gallochatechin, epigallocatechin gallates, vitamin A, vitamin E, and/or vitamin C. In some aspects, the additive may be mixed with an accelerant or an excipient. For example, the additive may be mixed with polyethylene glycol or xylitol. In some further aspects, the additive may be emulsified with the accelerant or excipient and mixed into a silk fibroin solution. In some further aspects, the solution may be deposited onto the food composition via spray-coating. Alternatively, the solution may be deposited onto the food composition via dip-coating. In some aspects, the silk fibroin may not be annealed after or before deposition. In some further aspects, the food composition may include multiple layers of silk fibroin. For example; the food could be sprayed with silk fibroin solution, dried, and then sprayed once more. This can happen any number of times to add thickness and additional layers. In some further aspects, the food composition may comprise of multiple layers, with each layer serving a function. For example, the food may be coated with silk fibroin. Then, the silk fibroin-coated food may be itself coated by another coating that is hydrophobic or water-tight such that water may not permeate the outer layer and reach the inner silk fibroin layer. In some further aspects, a tablet-coating may be utilized, where the silk fibroin is coated while in an industrially-relevant drum. Tablet coating may additionally be utilized, as well as film-coating.

Figure 8:
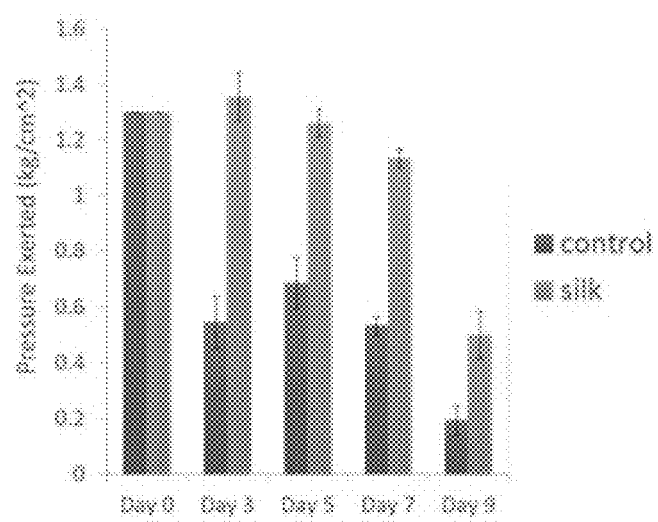
FIG. 8 depicts avocado firmness in control, untreated avocados and avocados coated with silk fibroin solution via spray deposition at baseline (0 days) and after 3, 5, 7, and 9 days (n=60).
Figure 9A:
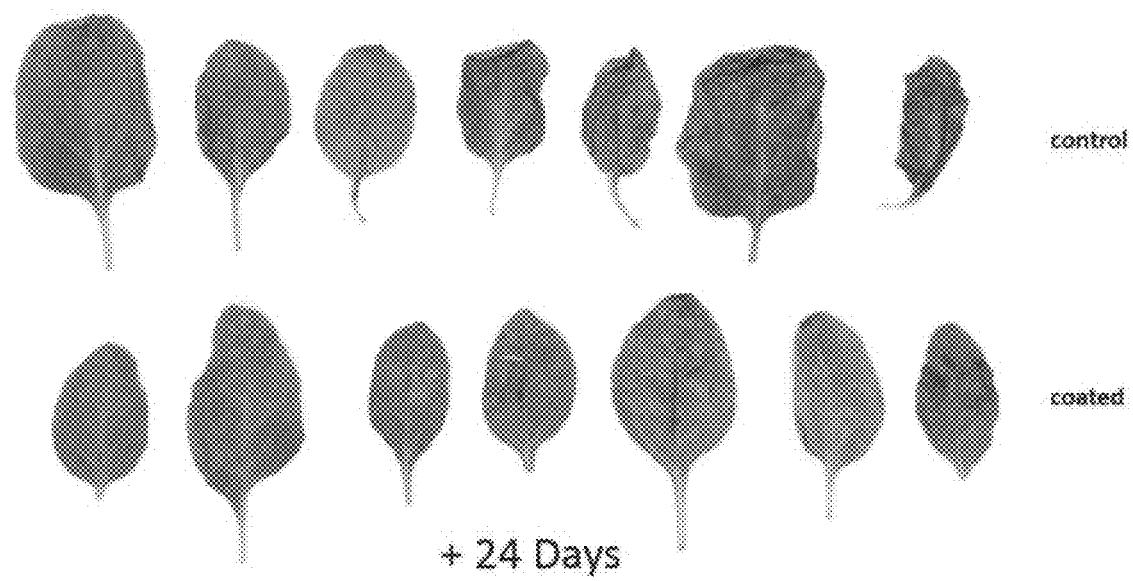
FIG. 9A depicts control, untreated spinach and spinach coated with silk fibroin solution via spray deposition after 24 days.
Figure 9B:
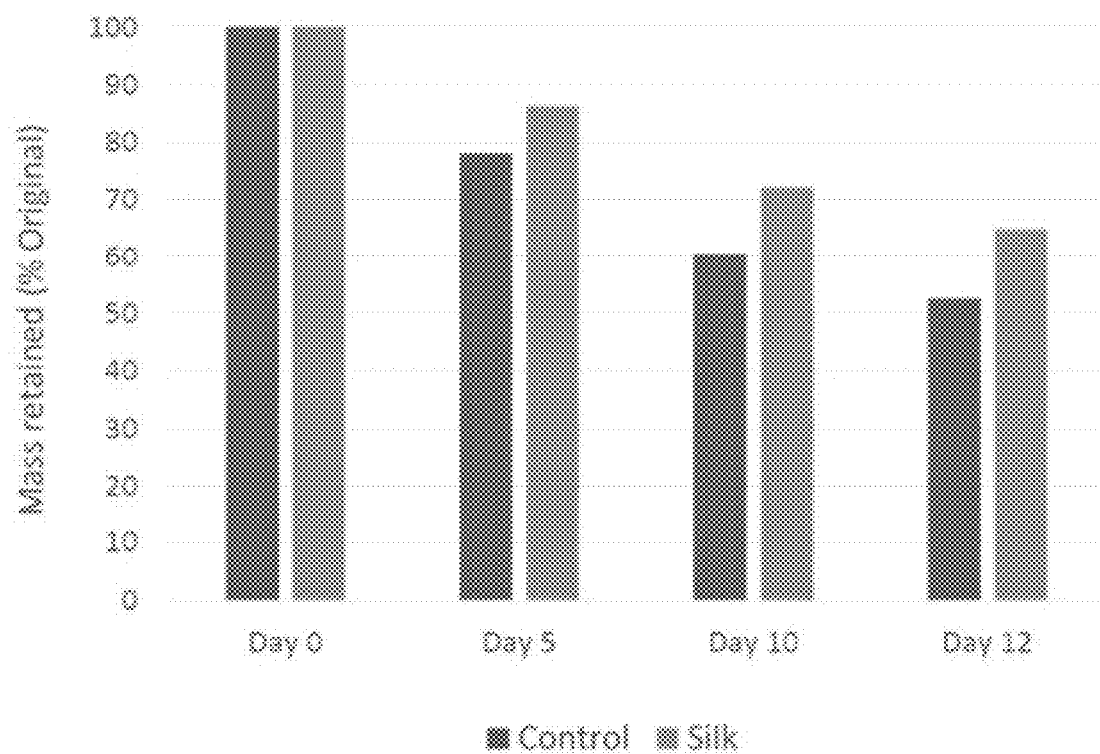
FIG. 9B depicts spinach mass retention in control, untreated spinach and spinach coated with silk fibroin solution via spray deposition at baseline (0 days) and after 5, 10, and 12 days.

FIGS. 1A, 1B, 2A, 2B, 5A, 5B, 9A, and 9B, demonstrate that silk deposition on foods by spray or dip coating assists with their preservation, regardless of whether the deposition step is paired with an annealing step. Thus, these findings indicate that pairing silk deposition with an annealing step is not necessary for preserving and extending the shelf-life of food products, such as avocados. Thus, the invention unexpectedly demonstrates that an additional annealing step is not necessary for extending the shelf-life of food products. Spray or dip coating food products with silk is sufficient for optimizing their preservation. This is further corroborated by FIGS. 1A, 2A, 3, and 4A which show that the percent mass loss of foods subjected to silk deposition is significantly reduced relative to control, irrespective of the presence of an annealing step. FIG. 8 also demonstrates that avocado firmness and is also consistently enhanced following silk treatment.

Figure 1A:
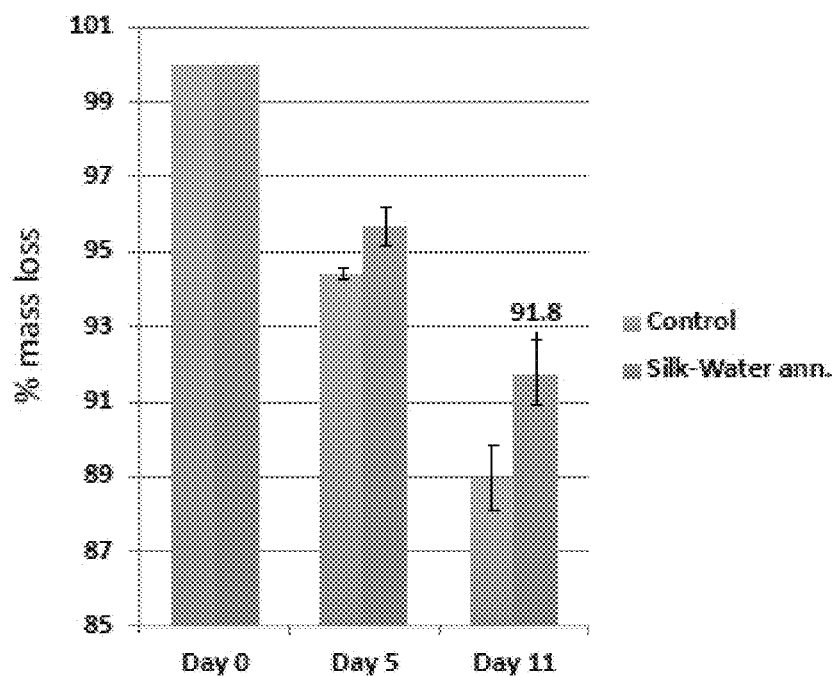
FIG. 1A depicts the percentage of mass loss in avocados not treated with the silk composition (control) and avocados treated with the silk composition and further exposed to a water-annealing step (silk-water ann.) after 0, 5, and 11 days.
Figure 1B:
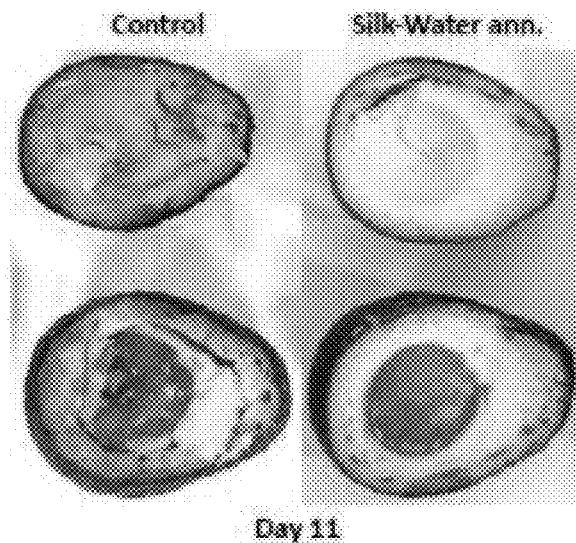
FIG. 1B depicts an avocado not treated with the silk composition (control) and an avocado treated with the silk composition and further exposed to a water-annealing step (silk-water ann.) after 11 days. Water-annealing can refer to exposing the fibroin to water or water vapor to increase the crystallinity of the fibroin.
Figure 2A:
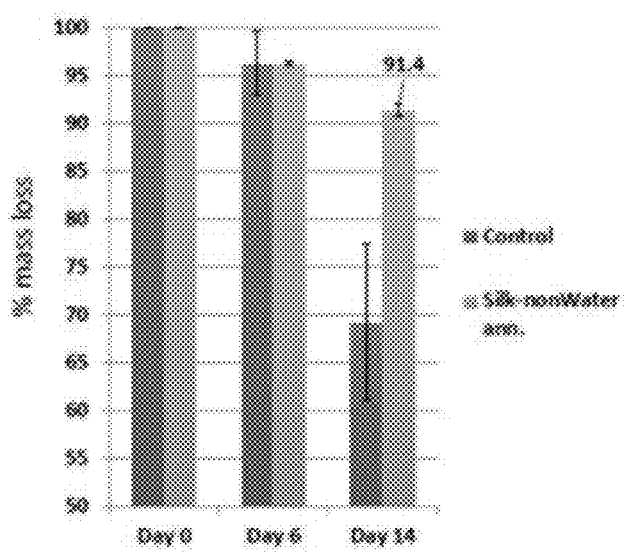
FIG. 2A depicts the percentage of mass loss in avocados not treated with the silk composition (control) and avocados treated with the silk composition without a water-annealing step (silk-nonwater ann.) after 0, 6, and 14 days.
Figure 2B:
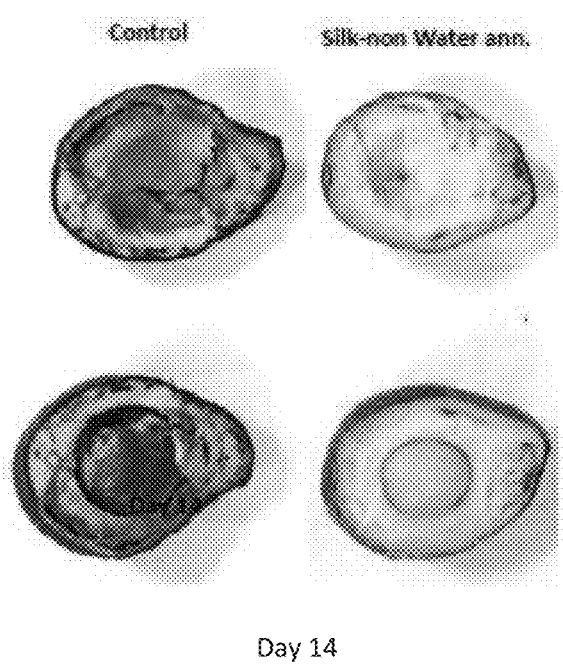
FIG. 2B depicts an avocado not treated with the silk composition (control) and an avocado treated with the silk composition without a water-annealing step (silk-nonwater ann.) after 14 days.
Figure 3:
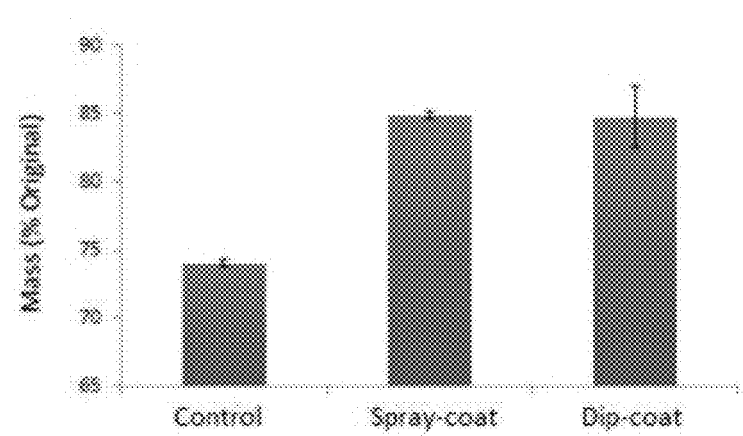
FIG. 3 depicts the percentage of mass loss in avocados having the silk composition applied by spraying and dipping after 10 days.
Figure 4A:
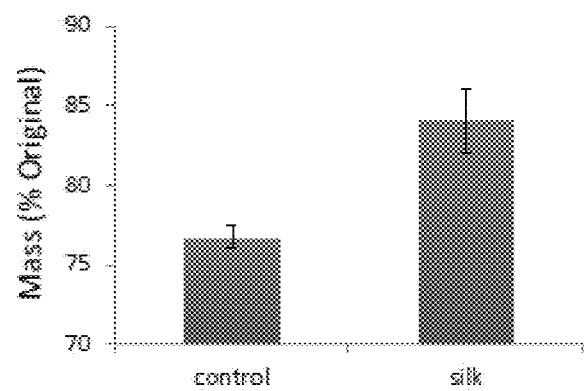
FIG. 4A depicts the percentage of mass loss in bananas not treated with the silk composition (control) in comparison to bananas treated with the silk composition (silk) after 9 days at room temperature.
Figure 4B:
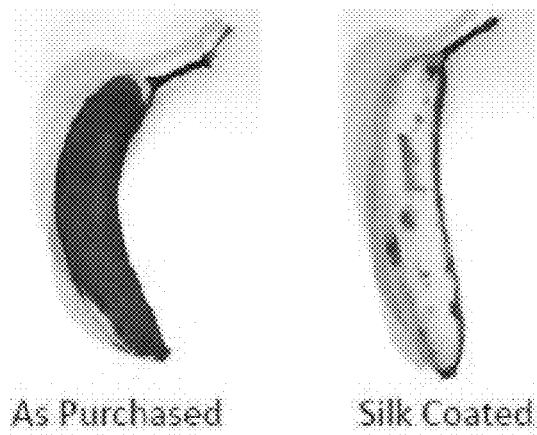
FIG. 4B depicts the bananas of FIG. 4A.
Figure 5A:
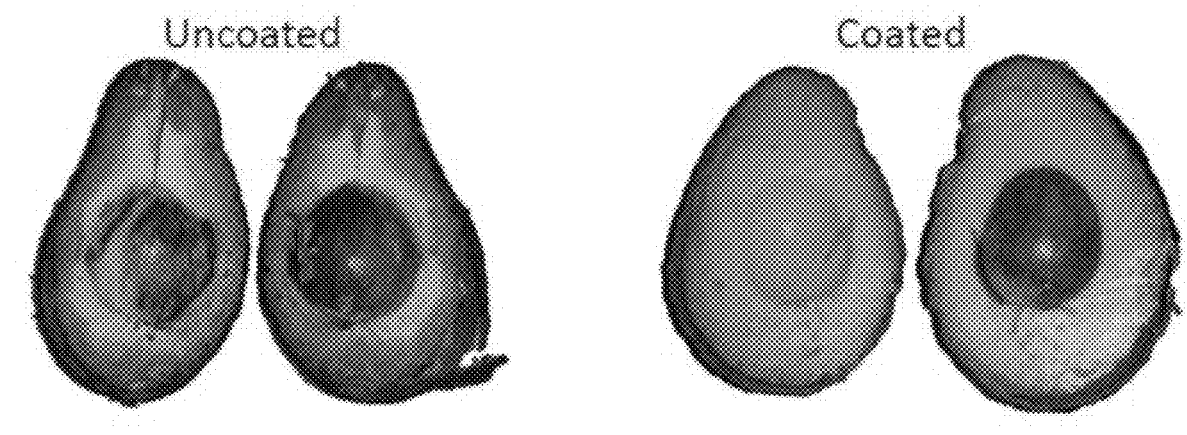
FIG. 5A and FIG. 5B depict avocados and beef not coated (uncoated) in comparison to those coated with the silk composition.
Figure 5B:
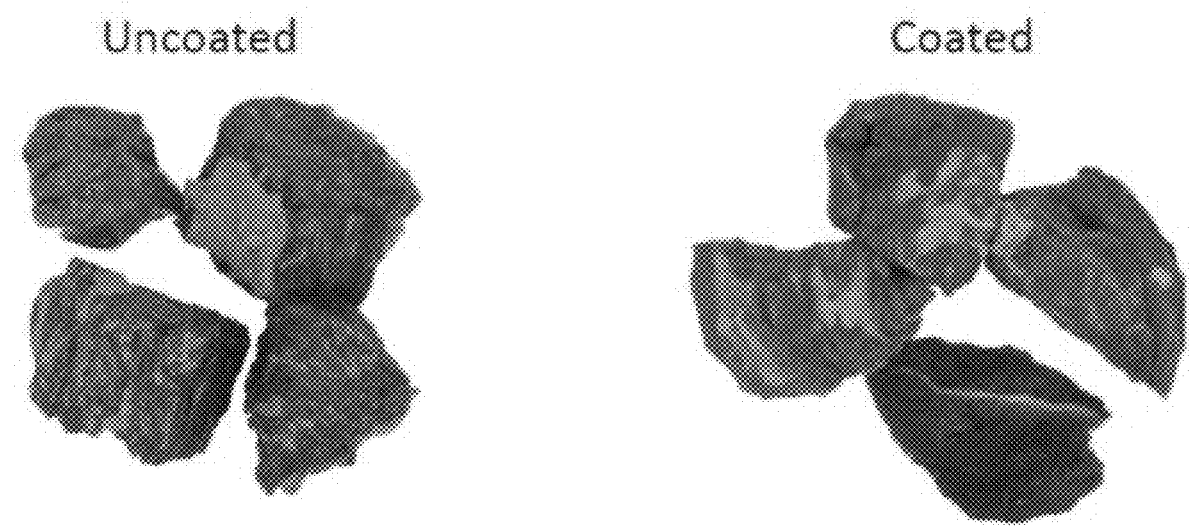
Figure 6:
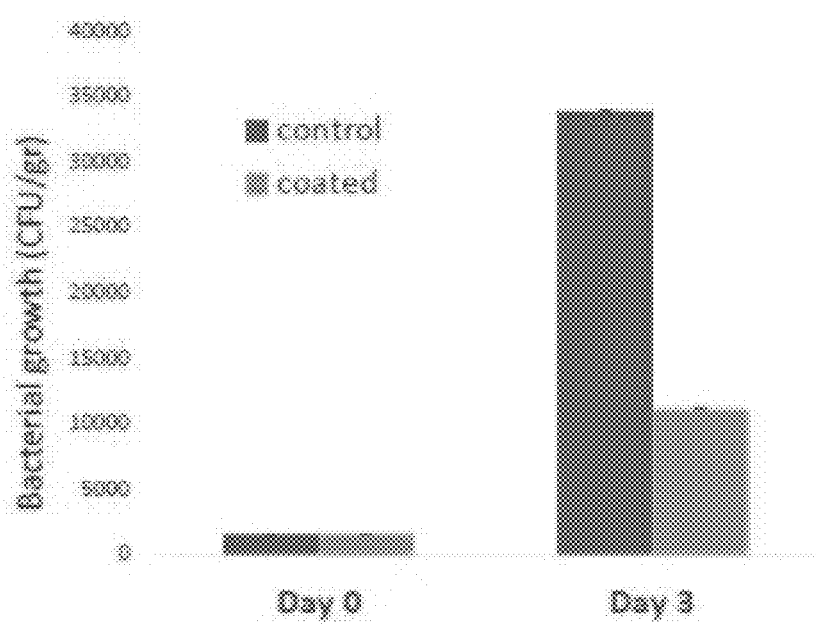
FIG. 6 depicts the growth of bacteria on beef not coated (control) or coated with the silk composition and maintained for 3 days at 40° F.
Figure 7:
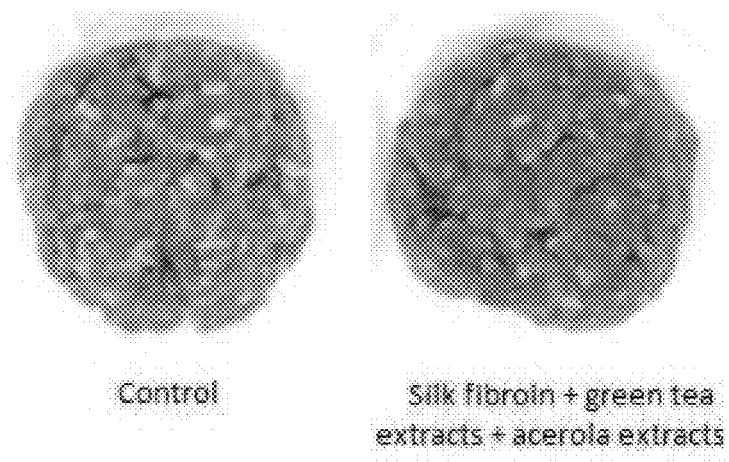
FIG. 7 depicts a control, untreated meat product (Control) and a meat product treated with actives such as green tea extracts or acerola and silk fibroin solution and excipients after 9 days.

Deposition of silk on food has also been shown to slow bacterial growth, as illustrated in FIG. 6. As demonstrated in FIG. 7, deposition of silk on beef not only enhanced its preservation relative to control with regards to the look and feel of the beef, but also the bacterial growth rates (FIG. 6). This may be further enhanced with additives, such as green tea and acerola extracts, which can be seen in FIG. 7. The silk fibroin may be dissolved in acetic acid or other solvents in order to further reduce microbial growth rates, as well as keep food fresher for longer.

In some aspects of the present embodiment, all or substantially all of the external surface of the food composition may be coated with the silk fibroin. In some aspects, the silk fibroin coating may comprise silk fibroin fragments ranging from 10 kDa-600 kDa. In some aspects, the thickness of a single silk fibroin layer in the surface of the food composition may be at least 12 nm. In some further aspects, the thickness of a silk fibroin layer may be no more than 180 µm. In some further aspects, the silk fibroin coating may be comprised of multiple layers, where the silk fibroin is added to the substrate, dried, and another layer is then added. This may be done numerous times to increase the number of layers. In some aspects the thickness of at least one layer is from about 5 um to 180 um. In some aspects, the additional layers may be comprised of a different coating. In some other aspects of the embodiment, the silk fibroin solution may be dried via air-drying, freeze-drying, vacuum drying, or heat-drying. In some alternative aspects of the embodiment, the silk fibroin may be mixed into the food composition. In some aspects of the embodiment, the silk fibroin may slow microbial growth in the food composition. In other alternative embodiments, the silk fibroin may alter moisture transport properties within the food composition. In some further embodiments, altering moisture and gas transport properties within the food composition may extend the shelf-life of the food composition by, for example, preventing sogginess. This may be done on prepared compositions of foods, such as a traditional sandwich or granola bar.

Another embodiment may be directed to a solution containing silk fibroin. In some aspects, no more than 25% of the solution may comprise silk fibroin fragments. In some further aspects, no more than 10% of the silk fibroin fragments may have a molecular weight of over 400 kDa. In some alternative further aspects, no more than 45% of the silk fibroin fragments may have a molecular weight of over 300 kDa.

Another embodiment may be directed to a composition comprising a substrate. In some aspects, the substrate may comprise a perishable, a perishable item, a perishable good, or a perishable product. A perishable may comprise an item or product likely to decay, spoil, or go bad quickly. Examples of a perishable include food, food items, candy, meat, gum, produce, baked goods, vegetables, fruit, power bars, chocolates, and processed foods. In some aspects, the substrate may be coated with at least one silk fibroin layer. In some aspects, the at least one silk fibroin layer may comprise an additive. In some aspects, the additive may function to stabilize the silk fibroin layer coated on the substrate. Alternatively, the additive may stabilize other ingredients being coated on the substrate. In some aspects, the additive may be a coloring agent, an antioxidant, a microorganism, an enzyme, a protein, a sugar, an acid, or a plasticizer. In some aspects, the additive may increase the flexibility and/or elasticity of the silk fibroin layer. In some aspects, the thickness of the at least one silk fibroin layer may range from about 12 nm to about 180 µm. In some aspects, the silk fibroin layer may comprise a dried silk fibroin solution. In some further aspects, the silk fibroin solution may comprise no more than 25% silk fibroin fragments. In some aspects, the crystallinity of the silk fibroin solution may increase following its addition to the substrate. In some aspects, increasing the crystallinity of the silk fibroin solution may comprise changing the pH of the silk fibroin solution; removing water, solvents, or additives from the silk fibroin solution; water-annealing the silk fibroin solution; or adding methanol, acetic acid, and/or ethanol to the silk fibroin solution. Increasing the crystallinity of the solution may occur prior to or after deposition of the silk fibroin onto a substrate or food composition by any of the above means, or means similar.

Another embodiment may be directed to a method of preparing a food composition. In some aspects, the method may comprise spray-coating the food composition. In some alternative aspects, the food composition may comprise dip-coating the food composition. In some alternative aspects, the food composition may comprise mixing the food composition. In some aspects, the food composition may be spray-coated, dip-coated, or mixed with silk fibroin fragments. In some aspects, the silk fibroin fragments may range from 10 kDa to 600 kDa.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. A food composition comprising silk fibroin, wherein the silk fibroin is added to the food composition as a solution in which powdered silk fibroin has been reconstituted within a solvent; wherein
between 0.1-25% (weight/volume) of the solution is comprised of silk fibroin fragments;
between 1-10% of the silk fibroin fragments within the silk fibroin solution has a molecular weight of over 400 kDa; and
between 10-45% of the silk fibroin fragments within the silk fibroin solution has a molecular weight of over 300 kDa.

2. The food composition of claim 1, wherein the silk fibroin is comprised within a solution deposited onto the food composition using spray-coating.

3. The food composition of claim 1, wherein the silk fibroin is comprised within a solution deposited onto the food composition using dip-coating.

4. The food composition of claim 1, wherein the silk fibroin is mixed into the food composition.

5. The food composition of claim 1, wherein the silk fibroin is deposited onto the food composition and is not annealed post-deposition.

6. The food composition of claim 1, wherein all or substantially all of an external surface of the food composition is coated with the silk fibroin.

7. The food composition of claim 1, wherein the silk fibroin solution is deposited onto the food composition and is dried via air-drying, freeze-drying, vacuum drying, or heat-drying post-deposition.

8. The food composition of claim 6, wherein the thickness of the silk fibroin-coated external surface is comprised of a single layer of at least 12 nm and no more than about 180 um.

9. The food composition of claim 6, wherein the thickness of the silk fibroin-coated external surface is comprised of a plurality of silk fibroin layers, wherein thickness of at least one layer is from about 5 um to about 180 um.

10. The food composition of claim 1, wherein the silk fibroin slows microbial growth on the food composition.

11. The food composition of claim 1, wherein the silk fibroin is comprised within a solution and a solvent of the solution is at least one of water, an acid with a pH of under 6.0, or an alcohol.

12. The food composition of claim 1, wherein at least one of the silk fibroin powder or the solvent contains an additive.

13. The food composition of claim 12, wherein the additive is at least one of a sugar, a plasticizer, a crosslinking agent, a bacteria, a metal, an enzyme, a biologic, an antimicrobial, a chelator, a nutrient, a vitamin, an antioxidant, a filler, a microorganism, or a protein.

14. The food composition of claim 12, wherein the additive is at least one of a coloring agent, a scent, a flavor, a green tea extract, a rosemary extract, a phenolic antioxidant, a catechin, an acerola extract, a chamomile extract, a *Malphigia emarginata*, a *Camellia sinensis*, an epicatechin, an epigallocatechin, a gallocatechin, or an epigallocatechin gallate.

15. The food composition of claim 1, wherein the added silk fibroin alters gas transport properties within the food composition, thereby extending a shelf-life of the food composition.

16. The food composition of claim 1, wherein the silk fibroin is comprised within a coating comprised of silk fibroin fragments with molecular weights ranging from 10 kDa-600 kDA.

17. The food composition of claim 1, wherein all or substantially all of an external surface of the food composition is coated with the silk fibroin, and wherein the thickness of the silk fibroin-coated external surface is comprised of a single layer of at least 12 nm and no more than about 180 um.

18. The food composition of claim 1, wherein between 10-35% of the silk fibroin fragments within the silk fibroin solution has a molecular weight of over 300 kDa.

19. A food composition comprising silk fibroin, wherein the silk fibroin is added to the food composition as a solution in which powdered silk fibroin has been reconstituted within a solvent; wherein
the silk fibroin solution is deposited onto the food composition using spray-coating,
the silk fibroin is not annealed post-deposition;
all or substantially all of an external surface of the food composition is coated with the silk fibroin, the silk fibroin coating being comprised of silk fibroin fragments with molecular weights ranging from 10 kDa-600 kDa and the external surface being comprised of a single layer with a thickness of at least 12 nm and no more than about 180 um;
between 0.1-25% (weight/volume) of the solution is comprised of silk fibroin fragments;

between 0.1-10% of the silk fibroin fragments within the silk fibroin solution has a molecular weight of over 400 kDa; and between 1-45% of the silk fibroin fragments within the silk fibroin solution has a molecular weight of over 300 kDa.

* * * * *